(12) United States Patent
Kakizakai et al.

(10) Patent No.: US 11,441,465 B2
(45) Date of Patent: Sep. 13, 2022

(54) EXHAUST GAS PURIFICATION DEVICE AND SHIP INCLUDING EXHAUST GAS PURIFICATION DEVICE

(71) Applicant: MITSUBISHI HEAVY INDUSTRIES ENGINE & TURBOCHARGER, LTD., Sagamihara (JP)

(72) Inventors: Takehiko Kakizakai, Sagamihara (JP); Toshihiro Fujii, Sagamihara (JP); Hitoshi Ito, Sagamihara (JP); Akira Otaki, Sagamihara (JP); Tomohide Hashiguchi, Sagamihara (JP); Shintaro Ide, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/269,382

(22) PCT Filed: Aug. 29, 2019

(86) PCT No.: PCT/JP2019/033832
§ 371 (c)(1),
(2) Date: Feb. 18, 2021

(87) PCT Pub. No.: WO2020/054439
PCT Pub. Date: Mar. 19, 2020

(65) Prior Publication Data
US 2021/0172362 A1 Jun. 10, 2021

(30) Foreign Application Priority Data

Sep. 14, 2018 (JP) .............................. JP2018-172241

(51) Int. Cl.
*F01N 3/20* (2006.01)
*F01N 3/035* (2006.01)
(Continued)

(52) U.S. Cl.
CPC ........... *F01N 3/2066* (2013.01); *F01N 3/035* (2013.01); *B63H 23/02* (2013.01); *F01N 3/28* (2013.01);
(Continued)

(58) Field of Classification Search
CPC combination set(s) only.
See application file for complete search history.

(56) References Cited

U.S. PATENT DOCUMENTS 9,714,600 B2 * 7/2017 Kwon ..................... G01S 19/14
10,294,839 B2    5/2019 Bailey
(Continued)

FOREIGN PATENT DOCUMENTS

| CN | 107787395 A | 3/2018 |
| CN | 110799733 A | 2/2020 |

(Continued)

OTHER PUBLICATIONS

International Preliminary Report on Patentability and Written Opinion of the International Searching Authority for corresponding International Application No. PCT/JP2019/033832, dated Mar. 25, 2021, with English translation.

(Continued)

*Primary Examiner* — Binh Q Tran
(74) *Attorney, Agent, or Firm* — Birch, Stewart, Kolasch & Birch, LLP

(57) ABSTRACT

An exhaust gas purification device is disposed in an exhaust passage of an engine disposed in an engine room defined in a hull, and is configured to remove at least a nitrogen oxide from an exhaust gas discharged from the engine. The exhaust gas purification device includes: a catalytic part including a selective reducing catalyst for selectively reducing the nitrogen oxide; a reducing agent addition device configured to add a reducing agent to the exhaust gas on an
(Continued)

upstream side of the catalytic part in a flow direction of the exhaust gas; and a casing configured to contain the catalytic part. At least a part of the casing is disposed inside the engine room.

14 Claims, 6 Drawing Sheets

(51) Int. Cl.
  *B63H 23/02* (2006.01)
  *F01N 3/28* (2006.01)
(52) U.S. Cl.
  CPC .... *F01N 2560/026* (2013.01); *F01N 2610/02* (2013.01)

(56) References Cited

U.S. PATENT DOCUMENTS

| | | | |
|---|---|---|---|
| 10,926,217 B2 * | 2/2021 | Sasaki | B63H 21/32 |
| 2010/0311291 A1 | 12/2010 | Rolla et al. | |
| 2011/0057459 A1 | 3/2011 | Piccolo | |
| 2011/0259440 A1 * | 10/2011 | Kawashima | B63B 1/38 137/234.6 |
| 2017/0009630 A1 * | 1/2017 | Takahata | B63H 21/32 |
| 2017/0122162 A1 * | 5/2017 | Patel | F01N 13/0097 |
| 2018/0080356 A1 * | 3/2018 | Fukui | F01N 3/08 |
| 2018/0306084 A1 * | 10/2018 | Inoue | F01N 3/2892 |
| 2020/0182117 A1 | 6/2020 | Morimitsu et al. | |

FOREIGN PATENT DOCUMENTS

| | | |
|---|---|---|
| DE | 10 2016 205 299 A1 | 10/2017 |
| EP | 2 574 736 A1 | 4/2013 |
| EP | 3 643 892 A1 | 4/2020 |
| JP | 10-203487 A | 8/1998 |
| JP | 2011-57211 A | 3/2011 |
| JP | 2011-207364 A | 10/2011 |
| JP | 2012-528762 A | 11/2012 |
| JP | 2012-240446 A | 12/2012 |
| JP | 2014-91368 A | 5/2014 |
| JP | 2016-137766 A | 8/2016 |
| JP | 2017-217982 A | 12/2017 |
| WO | WO 2009/007060 A1 | 1/2009 |

OTHER PUBLICATIONS

International Search Report for International Application No. PCT/JP2019/033832, dated Nov. 12, 2019.
Extended European Search Report for European Application No. 19859414.5, dated Jul. 16, 2021.
Office Action dated Dec. 23, 2021 issued in counterpart Chinese Application No. 201980055592.8 with an English Translation.

* cited by examiner

EXHAUST GAS PURIFICATION DEVICE AND SHIP INCLUDING EXHAUST GAS PURIFICATION DEVICE

TECHNICAL FIELD

The present disclosure relates to an exhaust gas purification device for removing NOx (nitrogen oxide) from exhaust gas discharged from an engine, and a ship including the exhaust gas purification device.

BACKGROUND

As the exhaust gas purification device for purifying NOx (nitrogen oxide) contained in the exhaust gas discharged from an engine (diesel engine), a urea SCR system is known (see Patent Document 1). In the urea SCR system, urea water injected into the exhaust gas is hydrolyzed by heat of the exhaust gas to produce ammonia as a reducing agent, and NOx is chemically reacted with ammonia in the presence of an SCR catalyst to reduce NOx to nitrogen and water, in order to purify NOx. The urea SCR system is provided with a casing containing an SCR catalyst.

The urea SCR system has been introduced in automobiles and the like, but has not been widely introduced in ships. In recent years, due to the tightening of NOx emission regulations on ships, the urea SCR system is retrofitted to ships (see Patent Document 1). As shown in Patent Document 1, a ship, particularly a ship to which the urea SCR system is retrofitted, has a limited space for the engine room in which the engine is mounted. Therefore, the casing containing the SCR catalyst is usually disposed outside the engine room.

CITATION LIST

Patent Literature

Patent Document 1: JP2017-217982A

SUMMARY

Problems to be Solved

The present inventors have found that, when the temperature of the exhaust gas on the upstream side of the SCR catalyst, that is, the exhaust gas flowing through the exhaust passage of the engine or the exhaust gas introduced into the casing drops below a predetermined temperature, deposits (urea deposits) may be generated from the exhaust gas into which urea water is injected (added), and the deposits may be accumulated in the exhaust passage of the engine or the casing.

If the deposits are accumulated in the casing and the SCR catalyst is clogged, the purification performance of the urea SCR system (exhaust gas purification device) may deteriorate. Further, when the deposits are accumulated in the exhaust passage and the exhaust passage is narrowed, the flow of the exhaust gas is obstructed, and the pressure of the exhaust gas flowing through the exhaust passage increases, which may decrease the combustion efficiency of the engine.

In view of the above circumstances, an object of at least one embodiment of the present invention is to provide an exhaust gas purification device whereby it is possible to suppress the occurrence of deposits and prevent the reduction in the performance of the exhaust gas purification device and the engine due to the deposits.

Solution to the Problems (1) An exhaust gas purification device according at least one embodiment of the present invention is disposed in an exhaust passage of an engine disposed in an engine room defined in a hull, and is configured to remove at least a nitrogen oxide from an exhaust gas discharged from the engine. The exhaust gas purification device comprises: a catalytic part including a selective reducing catalyst for selectively reducing the nitrogen oxide; a reducing agent addition device configured to add a reducing agent to the exhaust gas on an upstream side of the catalytic part in a flow direction of the exhaust gas; and a casing configured to contain the catalytic part. At least a part of the casing is disposed inside the engine room.

According to the above configuration (1), the exhaust gas purification device includes the catalytic part including the selective reducing catalyst for selectively reducing the nitrogen oxide, the reducing agent addition device configured to add the reducing agent to the exhaust gas on the upstream side of the catalytic part in the flow direction of the exhaust gas, and the casing configured to contain the catalytic part. At least a part of the casing is disposed inside the engine room in which the engine is disposed. Thus, since the casing is disposed near the engine, the exhaust gas discharged from the engine can be introduced into the casing before the temperature drops below the predetermined temperature. Further, since the exhaust gas flowing through the exhaust passage of the engine and the exhaust gas introduced into the casing are kept at a higher temperature than the predetermined temperature, the occurrence of deposits in the exhaust passage of the engine and the casing can be suppressed. When the occurrence of deposits is suppressed, the accumulation of deposits in the exhaust passage and the clogging of the catalytic part can be suppressed. Thus, it is possible to prevent the decrease in the purification performance of the exhaust gas purification device and the decrease in the combustion efficiency of the engine due to the deposits.

(2) In some embodiments, the exhaust gas purification device described in the above (1) further comprises an exhaust gas pipe connecting an exhaust port of the engine and an intake port of the casing. The exhaust gas pipe satisfies L/D<10, where L is a length of the exhaust gas pipe from the exhaust port of the engine to the intake port of the casing, and D is an inner diameter of the exhaust gas pipe.

According to the above configuration (2), the length L of the exhaust gas pipe connecting the exhaust port of the engine and the intake port of the casing is less than 10 times the inner diameter D of the exhaust gas pipe. When the length of the exhaust gas pipe is reduced, the distance between the exhaust port of the engine and the intake port of the casing is shortened. Thus, it is possible to suppress the reduction in the temperature of the exhaust gas to be introduced into the casing.

(3) In some embodiments, in the exhaust gas purification device described in the above (1) or (2), the casing is disposed above a marine gear disposed in the engine room. The marine gear is configured to change a rotational speed of a crank shaft of the engine and transmit the rotational speed to a propeller shaft.

According to the above configuration (3), the casing is arranged above the marine gear disposed in the engine room. In the engine room, an engine accessory such as a cooling water pipe for feeding cooling water for cooling the engine may be provided above the engine. Therefore, when the casing is arranged in the space above the marine gear, which has more room than the space above the engine, the layout of the exhaust gas purification device can be improved. Further, since the casing can be arranged at a position away from the cooling water pipe, it is possible to suppress the decrease in the temperature of the exhaust gas flowing through the exhaust passage due to heat transfer from the cooling water pipe. Further, when the casing is not arranged above the engine, the workability for servicing the engine can be improved.

(4) In some embodiments, in the exhaust gas purification device described in the above (3), the casing has a longitudinal direction, and the casing is arranged such that the longitudinal direction is along a fore-aft direction of the hull.

According to the above configuration (4), the casing has a longitudinal direction and is arranged such that the longitudinal direction is along the fore-aft direction of the hull. Here, since the propeller shaft extends along the fore-aft direction, a dead space is likely to occur along the fore-aft direction above the marine gear to which the propeller shaft and the propeller shaft are connected. When the casing is arranged in this dead space, the layout of the exhaust gas purification device can be improved. Further, since the casing is arranged such that the longitudinal direction is along the fore-aft direction of the hull, even if there is no room in the height direction in the space above the marine gear, the casing can be arranged in the space.

(5) In some embodiments, in the exhaust gas purification device described in the above (3) or (4), the marine gear has a height dimension less than a height dimension of the engine.

According to the above configuration (5), since the height dimension of the marine gear is less than the height dimension of the engine, the height dimension of the space above the marine gear in the engine room is larger than that of the space above the engine. Accordingly, even if there is no room in the height direction in the space above the engine in the engine room, since the space above the marine gear has room in the height direction, the casing can be arranged in the space above the marine gear.

(6) In some embodiments, in the exhaust gas purification device described in any of the above (3) to (5), $L2<L1/2$ is satisfied, where $L1$ is a length from one end of the engine close to the marine gear to another end of the engine away from the marine gear, and $L2$ is a length from the one end to an exhaust port of the engine, in a fore-aft direction of the hull.

According to the above configuration (6), in the fore-aft direction of the hull, $L2<L1/2$ is satisfied, where $L1$ is a length from one end of the engine close to the marine gear to the other end of the engine away from the marine gear, and $L2$ is a length from the one end to the exhaust port of the engine. That is, the exhaust port of the engine is disposed closer to the marine gear than the center of the engine in the fore-aft direction, so that the distance between the intake port of the casing arranged above the marine gear and the exhaust port of the engine can be shortened. When the distance between the exhaust port of the engine and the intake port of the casing is shortened, it is possible to suppress the reduction in the temperature of the exhaust gas to be introduced into the casing.

(7) In some embodiments, in the exhaust gas purification device described in the above (1) or (2), the casing has a longitudinal direction, and the casing is arranged above the engine such that the longitudinal direction is along a vertical direction.

According to the above configuration (7), since the casing has a longitudinal direction, and the casing is arranged above the engine such that the longitudinal direction is along the vertical direction, the distance between the exhaust port of the engine and the intake port of the casing can be shortened. When the distance between the exhaust port of the engine and the intake port of the casing is shortened, it is possible to suppress the reduction in the temperature of the exhaust gas to be introduced into the casing.

(8) In some embodiments, in the exhaust gas purification device described in the above (7), a part of the casing is disposed inside the engine room, and another part of the casing is disposed outside the engine room.

According to the above configuration (8), since a part of the casing disposed above the engine is disposed inside the engine room in which the engine is disposed, the distance between the exhaust port of the engine and the intake port of the casing can be shortened. When the distance between the exhaust port of the engine and the intake port of the casing is shortened, it is possible to suppress the reduction in the temperature of the exhaust gas to be introduced into the casing. Further, since another part of the casing is disposed outside the engine room, even if there is no room in the height direction in the space above the engine in the engine room, the casing can be arranged such that the longitudinal direction is along the vertical direction.

(9) In some embodiments, in the exhaust gas purification device described in the above (7) or (8), the casing is disposed below a stack for discharging the exhaust gas from the exhaust passage to outside.

According to the above configuration (9), the casing is disposed below the stack for discharging the exhaust gas from the exhaust passage to the outside. Since the casing is arranged such that the longitudinal direction is along the vertical direction, the distance between the exhaust port of the casing and the stack can be shortened. When the distance between the exhaust port of the casing and the stack is shortened, the exhaust gas purification device can be compactly arranged in the ship.

(10) In some embodiments, in the exhaust gas purification device described in any of the above (3) to (9), an exhaust port of the engine is disposed at an upper portion of the engine.

According to the above configuration (10), the exhaust port of the engine is disposed at an upper portion of the engine. Since the casing is disposed above the marine gear or the engine, the distance between the exhaust port of the engine and the intake port of the casing can be shortened. When the distance between the exhaust port of the engine and the intake port of the casing is shortened, it is possible to suppress the reduction in the temperature of the exhaust gas to be introduced into the casing.

(11) In some embodiments, in the exhaust gas purification device described in any of the above (1) to (10), the reducing agent addition device includes an injection nozzle attached to the casing and having a nozzle hole inserted in the casing. The injection nozzle is configured to inject the reducing agent into the casing.

According to the above configuration (11), since the injection nozzle is attached to the casing, the injection nozzle is close to the catalytic part. When the injection nozzle is close to the catalytic part, it is possible to narrow a region of the exhaust passage in which the exhaust gas containing the reducing agent flows. Further, it is possible to suppress the occurrence of deposits on the upstream side of the region of the exhaust passage in the flow direction of the exhaust gas. In addition, since the injection nozzle is attached to the casing, the configuration of the reducing agent addition device can be simplified, and the work of attaching the reducing agent addition device to the ship can be facilitated.

(12) In some embodiments, in the exhaust gas purification device described in the above (11), the injection nozzle is configured to jet the reducing agent along a direction intersecting a flow direction of the exhaust gas.

According to the above configuration (12), the injection nozzle jets the reducing agent along a direction intersecting the flow direction of the exhaust gas, so that the reducing agent can be mixed with the exhaust gas uniformly from an inner wall portion of the casing with the injection nozzle to an opposite inner wall portion away from the injection nozzle. Thus, it is possible to efficiently purify the nitrogen oxide.

(13) A ship according to at least one embodiment of the present invention comprises: a hull; an engine disposed in an engine room defined in the hull; an exhaust passage of the engine; and the exhaust gas purification device described in any of the above (1) to (12).

According to the above configuration (13), the ship can remove the nitrogen oxide from the exhaust gas discharged from the engine with the exhaust gas purification device. Further, since the exhaust gas flowing through the exhaust passage of the engine and the exhaust gas introduced into the casing are kept at a higher temperature than a predetermined temperature, the occurrence of deposits in the exhaust passage of the engine and the casing can be suppressed.

Advantageous Effects

At least one embodiment of the present invention provides an exhaust gas purification device whereby it is possible to suppress the occurrence of deposits and prevent the reduction in the performance of the exhaust gas purification device and the engine due to the deposits.

DETAILED DESCRIPTION

Figure 1:
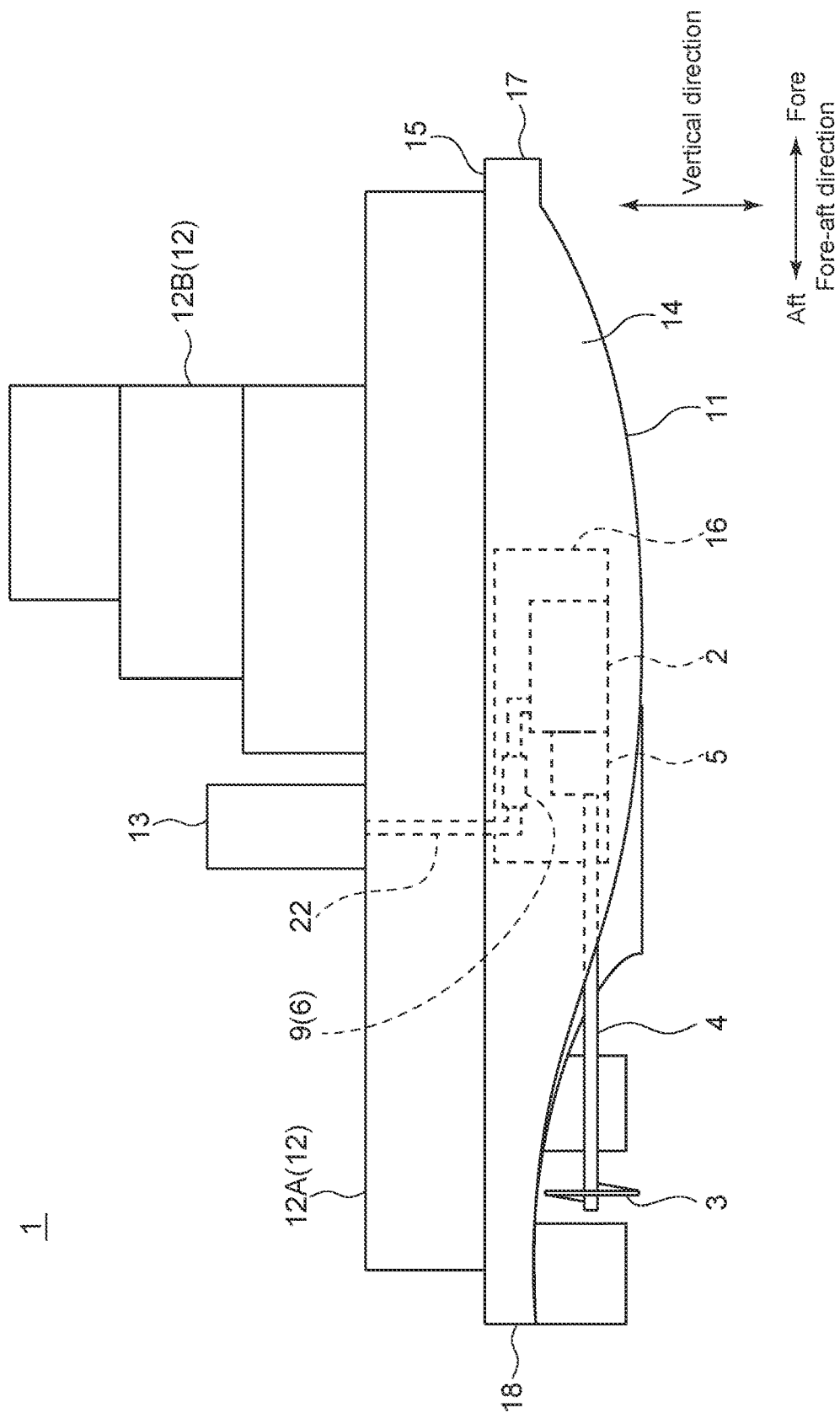
FIG. 1 is a schematic side view of a ship including an exhaust gas purification device according to an embodiment of the present invention.

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

FIG. 1 is a schematic side view of a ship including an exhaust gas purification device according to an embodiment of the present invention. The exhaust gas purification device 6 is installed in a ship 1 as shown in FIG. 1. As shown in FIG. 1, the ship 1 includes a hull 11 having a shell including a side shell 14 and an upper deck 15, an upper structure 12 disposed above the hull 11, and a stack 13 disposed above the hull 11. Further, an engine room 16 is formed inside the hull 11. Herein, as shown in FIG. 1, the front-back direction of the hull 11 is referred to as the fore-aft direction, the front side of the hull 11 with a bow 17 is referred to as the fore side, and the back side of the hull 11 with a stern 18 is referred to as the aft side.

In the illustrated embodiment, as shown in FIG. 1, the upper structure 12 includes a first upper structure 12A of one layer disposed so as to protrude from the upper deck 15 of the hull 11 and extend along the fore-aft direction, and a second upper structure 12B of three layers disposed so as to protrude from the first upper structure 12A. The second upper structure 12B is disposed fore of the center in the fore-aft direction. Further, the stack 13 is disposed aft of the second upper structure 12B so as to protrude from the first upper structure 12A.

As shown in FIG. 1, the ship 1 includes an engine 2 (diesel engine), a propeller 3, a propeller shaft 4, a marine gear 5, and the exhaust gas purification device 6 described above. The propeller shaft 4 and the marine gear 5 are configured to transmit the power of the engine 2 to the propeller 3. The propeller 3 is configured to be rotationally driven by the power of the engine 2 transmitted via the propeller shaft 4 and the marine gear 5 to impart propulsive force to the ship 1. Further, the marine gear 5 is configured to change the rotational speed of a crank shaft of the engine 2 and transmit it to the propeller shaft 4. The marine gear 5 has, for example, gears, and is configured to output torque according to the reduction ratio by decelerating the rotational speed of the power of the engine 2.

Figure 2:
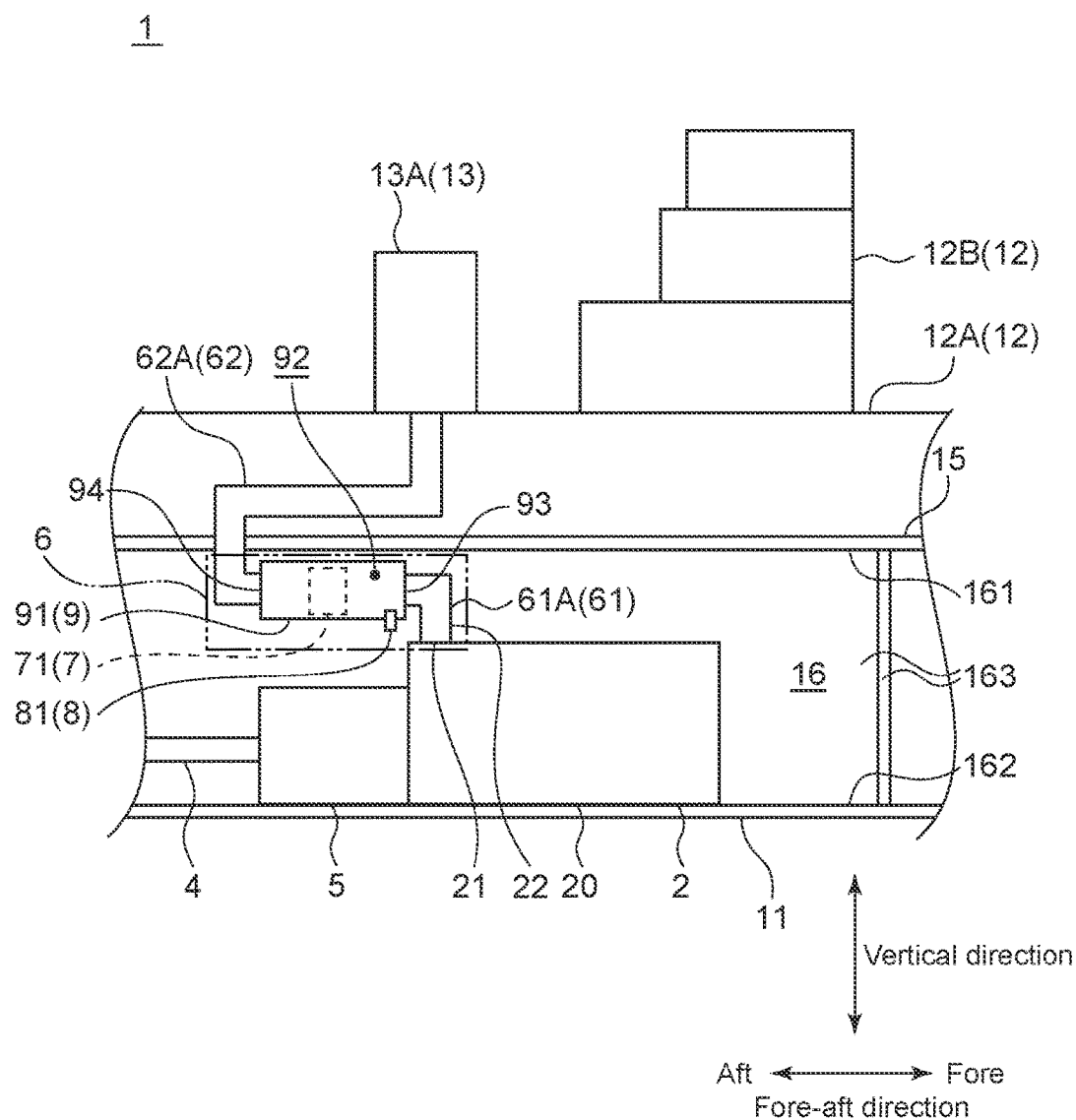
FIG. 2 is a partial, schematic side view of the ship for describing the exhaust gas purification device according to an embodiment of the present invention.

FIG. 2 is a partial, schematic side view of the ship for describing the exhaust gas purification device according to an embodiment of the present invention. In the illustrated embodiment, as shown in FIG. 2, the engine room 16 is defined in the hull 11 by an upper plate portion 161 extending in the horizontal direction, a bottom plate portion 162 disposed below the upper plate portion 161 and extending in the horizontal direction, and a plurality of side plate portions 163 extending along the vertical direction so as to connect the upper plate portion 161 and the bottom plate portion 162. Further, as shown in FIGS. 1 and 2, the engine 2 and the marine gear 5 are disposed inside the engine room 16. The engine 2 has a longitudinal direction along the fore-aft direction. The marine gear 5 is disposed aft of the engine 2 in the vicinity of the engine 2 so as to be adjacent to the engine 2. One end of the propeller shaft 4 is connected to the marine gear 5, and the other end extends aft. The propeller 3 is attached to the other end of the propeller shaft 4 located on the aft side.

As shown in FIG. 2, the engine 2 includes at least an engine body 20 having a combustion chamber (not shown) defined inside the engine 2, and an exhaust passage 22 which is a passage for discharging the exhaust gas discharged from the combustion chamber of the engine body 20 to the outside of the engine 2. As shown in FIG. 2, the exhaust passage 22 connects an exhaust port 21 of the engine body 20 and the stack 13. The engine 2 may further include an intake passage which is a passage for supplying air (combustion gas) outside the engine 2 to the combustion chamber, and a general configuration of an engine, such as a fuel injection valve for injecting non-combusted fuel into the combustion chamber. When the engine 2 is a single cylinder, the outlet of the exhaust port may be the exhaust port 21 of the engine body 20. When the engine 2 has multiple cylinders, the outlet of the exhaust manifold disposed downstream of the exhaust port in the exhaust gas flow direction may be the exhaust port 21 of the engine body 20.

As shown in FIG. 2, at least a part of the exhaust gas purification device 6 is disposed in the exhaust passage 22 of the engine 2. The exhaust gas purification device 6 is configured to remove at least NOx (nitrogen oxide) from the exhaust gas discharged from the exhaust port 21 of the engine body 20. The exhaust gas having passed through from the exhaust port 21 of the engine body 20 and flowing through the exhaust passage 22 is purified by the exhaust gas purification device 6 and then discharged from the stack 13 to the outside of the ship 1.

As shown in FIG. 2, the exhaust gas purification device 6 includes a catalytic part 7 including a selective reducing catalyst 71 for selectively reducing NOx, a reducing agent addition device 8 configured to add a reducing agent to the exhaust gas on the upstream side of the catalytic part 7 in the flow direction of the exhaust gas, and a casing 9 configured to contain the catalytic part 7.

In the illustrated embodiment, as shown in FIG. 2, the exhaust gas purification device 6 is composed of an SCR device (selective catalytic reduction denitration device) using urea water as the reducing agent. The selective reducing catalyst 71 is a urea water adsorption type SCR catalyst which converts urea water into ammonia and reduces NOx on the catalyst. The reducing agent addition device 8 includes an injection nozzle 81 configured to jet (add) the reducing agent to the exhaust gas on the upstream side of the catalytic part 7 in the flow direction of the exhaust gas, a reducing agent tank (not shown) for storing the reducing agent, and a reducing agent supply passage (not shown) for supplying the reducing agent from the reducing agent tank to the injection nozzle 81. The reducing agent stored in the reducing agent tank is jetted to the exhaust gas on the upstream side of the catalytic part 7 in the flow direction of the exhaust gas via the reducing agent supply passage. In the embodiment shown in FIG. 2, the injection nozzle 81 is attached to the casing 9 and has a nozzle hole (not shown) inserted in the casing 9. The injection nozzle 81 is configured to inject urea water as the reducing agent into the casing 9.

Further, in the illustrated embodiment, as shown in FIG. 2, the casing 9 has a cylinder portion 91 having a longitudinal direction, an interior space 92 defined in the cylinder portion 91, an intake port 93 disposed at one end of the cylinder portion 91 in the longitudinal direction and communicating with the interior space 92, and an exhaust port 94 disposed at the other end of the cylinder portion 91 in the longitudinal direction and communicating with the interior space 92. The catalytic part 7 is accommodated in the interior space 92. The injection nozzle 81 is attached to the casing 9 at a position offset from the portion where the catalytic part 7 is contained toward the intake port 93.

The casing 9 is disposed in the middle of the exhaust passage 22 of the engine 2. As shown in FIG. 2, the exhaust passage 22 of the engine 2 includes a first exhaust gas pipe 61 connecting the exhaust port 21 of the engine body 20 and the intake port 93 of the casing 9, and a second exhaust gas pipe 62 connecting the exhaust port 94 of the casing 9 and the stack 13.

The exhaust gas purification device 6 is configured such that urea water injected into the exhaust gas is hydrolyzed by heat of the exhaust gas to produce ammonia (ammonia gas) as the reducing agent, and NOx is chemically reacted with ammonia in the presence of the SCR catalyst to reduce NOx to nitrogen and water, whereby NOx is purified. Ammonia produced from urea water is adsorbed on the SCR catalyst and reacts with NOx by the action of the SCR catalyst to purify NOx.

The chemical reaction in which urea water purifies NOx is typically represented by the following chemical reaction formulae (1) to (3).

$$4NO + 4NH_3 + O_2 \rightarrow 4N_2 + 6H_2O \qquad \text{Formula (1)}$$

$$2NO_2 + 4NH_3 \rightarrow 3H_2 + 6H_2O \qquad \text{Formula (2)}$$

$$NO + NO_2 + 2NH_3 \rightarrow 2N_2 + 3H_2O \qquad \text{Formula (3)}$$

In the ship 1 as described above, when the temperature of the exhaust gas flowing through the exhaust passage 22 of the engine 2 or the exhaust gas introduced into the casing 9 drops below a predetermined temperature, deposits (urea deposits) may be generated from the reducing agent jetted (added) by the reducing agent addition device 8 to the exhaust gas on the upstream side of the catalytic part 7, and the deposits may be accumulated in the exhaust passage 22 of the engine 2 or the casing 9. In some embodiments, the predetermined temperature is 180° C.±5° C.

If the deposits are accumulated in the catalytic part 7 and the catalytic part 7 is clogged, the purification performance of the exhaust gas purification device 6 may deteriorate. Further, when the deposits are accumulated on the surface in the vicinity of the nozzle hole of the injection nozzle 81, the mixing of urea water jetted from the injection nozzle 81 and the exhaust gas is hindered. This may also deteriorate the purification performance of the exhaust gas purification device 6. Further, when the deposits are accumulated in the exhaust passage 22 and the exhaust passage 22 is narrowed, the flow of the exhaust gas is obstructed, and the pressure of the exhaust gas flowing through the exhaust passage 22 increases, which may decrease the combustion efficiency of the engine 2.

As described above, the exhaust gas purification device 6 according to some embodiments includes the catalytic part 7 including the selective reducing catalyst 71 for selectively reducing NOx (nitrogen oxide), the reducing agent addition device 8 configured to add the reducing agent to the exhaust gas on the upstream side of the catalytic part 7 in the flow direction of the exhaust gas, and the casing 9 configured to contain the catalytic part 7. Further, as shown in FIGS. 1 and 2, at least a part of the casing 9 is disposed inside the engine room 16 in which the engine 2 is disposed. In this case, since the casing 9 is disposed near the engine 2, the exhaust gas discharged from the engine 2 can be introduced into the casing 9 before the temperature drops below the predetermined temperature. Further, since the exhaust gas flowing through the exhaust passage 22 of the engine 2 and the exhaust gas introduced into the casing 9 are kept at a higher temperature than the predetermined temperature, the occurrence of deposits in the exhaust passage 22 of the engine 2 and the casing 9 can be suppressed. When the occurrence of deposits is suppressed, the accumulation of deposits in the exhaust passage 22 and the clogging of the catalytic part 7 can be suppressed. Thus, it is possible to prevent the decrease in the purification performance of the exhaust gas purification device 6 and the decrease in the combustion efficiency of the engine 2 due to the deposits.

In addition, in a ship not provided with the exhaust gas purification device 6, a muffler (not shown) for muting the driving sound of the engine 2 is provided in the exhaust passage 22, but the ship 1 does not have to be provided with a muffler since the exhaust gas purification device 6 exerts a muting function.

Figure 3:
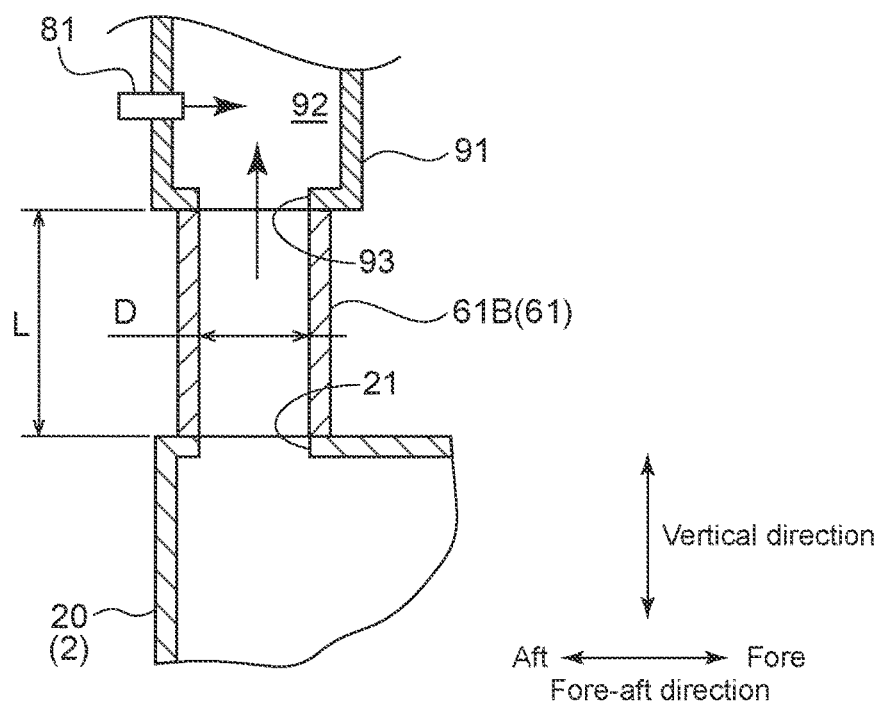
FIG. 3 is a schematic cross-sectional view for describing an exhaust gas pipe connecting an exhaust port of an engine and an intake port of a casing.
Figure 4:
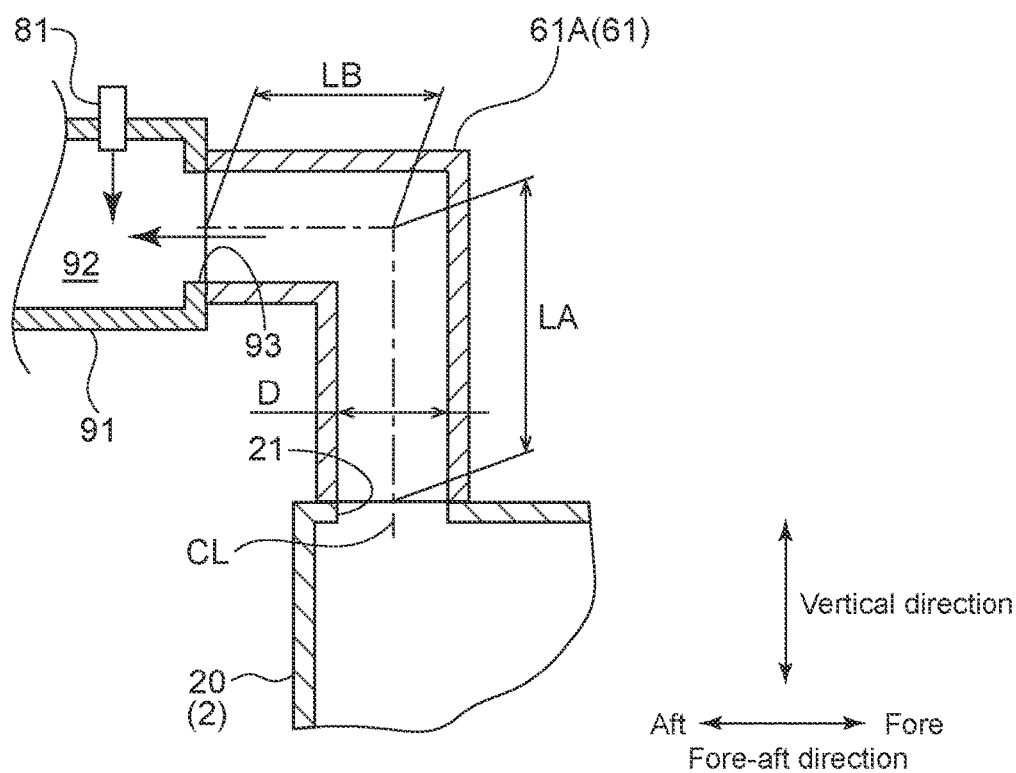
FIG. 4 is a schematic cross-sectional view for describing an exhaust gas pipe connecting an exhaust port of an engine and an intake port of a casing.

FIGS. 3 and 4 are schematic cross-sectional views for describing the exhaust gas pipe connecting the exhaust port of the engine and the intake port of the casing. In some embodiments, the exhaust gas purification device 6 further includes the first exhaust gas pipe 61 (exhaust gas pipe) connecting the exhaust port 21 of the engine 2 and the intake port 93 of the casing 9. Further, the first exhaust gas pipe 61 satisfies L/D<10, where L is the length of the first exhaust gas pipe 61 from the exhaust port 21 of the engine 2 to the intake port 93 of the casing 9, and D is the inner diameter of the first exhaust gas pipe 61. The first exhaust gas pipe 61 may be formed by connecting a plurality of exhaust gas pipes in series.

In the embodiment shown in FIG. 3, the exhaust port 21 of the engine 2 and the intake port 93 of the casing 9 are arranged so as to face each other. Further, the first exhaust gas pipe 61 connecting the exhaust port 21 of the engine 2 and the intake port 93 of the casing 9 is a first exhaust gas pipe 61B formed in a straight tube extending along the longitudinal direction. In this case, the total length of the first exhaust gas pipe 61B is the length L of the first exhaust gas pipe 61B.

In the embodiment shown in FIG. 4, the first exhaust gas pipe 61 connecting the exhaust port 21 of the engine 2 and the intake port 93 of the casing 9 is a first exhaust gas pipe 61A having a bent portion at a predetermined angle in the middle of the length. More specifically, the first exhaust gas pipe 61A is an elbow whose length is bent at a right angle. In this case, the sum of the center lines CL of the first exhaust gas pipe 61A is the length L of the first exhaust gas pipe 61A. That is, in FIG. 4, the sum of the length LA of the center line CL at the portion of the first exhaust gas pipe 61A connected to the exhaust port 21 of the engine 2 and the length LB of the center line CL at the portion of the first exhaust gas pipe 61A connected to the intake port 93 of the casing 9 is the length L of the first exhaust gas pipe 61A.

As the length L of the first exhaust gas pipe 61 connecting the exhaust port 21 of the engine 2 and the intake port 93 of the casing 9 is reduced, the temperature loss of the exhaust gas flowing through the first exhaust gas pipe 61 is reduced, and the temperature of the exhaust gas introduced into the casing 9 is prevented from dropping. According to the above configuration, the length L of the first exhaust gas pipe 61 connecting the exhaust port 21 of the engine 2 and the intake port 93 of the casing 9 is less than 10 times the inner diameter D of the first exhaust gas pipe 61. Thus, since the intake port 93 of the casing 9 is disposed near the exhaust port 21 of the engine 2 via the first exhaust gas pipe 61, the temperature loss of the exhaust gas flowing through the first exhaust gas pipe 61 can be reduced, and the exhaust gas discharged from the engine 2 can be introduced into the casing 9 before the temperature drops below the predetermined temperature. As a result, the exhaust gas flowing through the exhaust passage 22 of the engine 2 and the exhaust gas introduced into the casing 9 are kept at a higher temperature than the predetermined temperature, so that the occurrence of deposits in the exhaust passage 22 of the engine 2 and the casing 9 can be suppressed.

Figure 5:
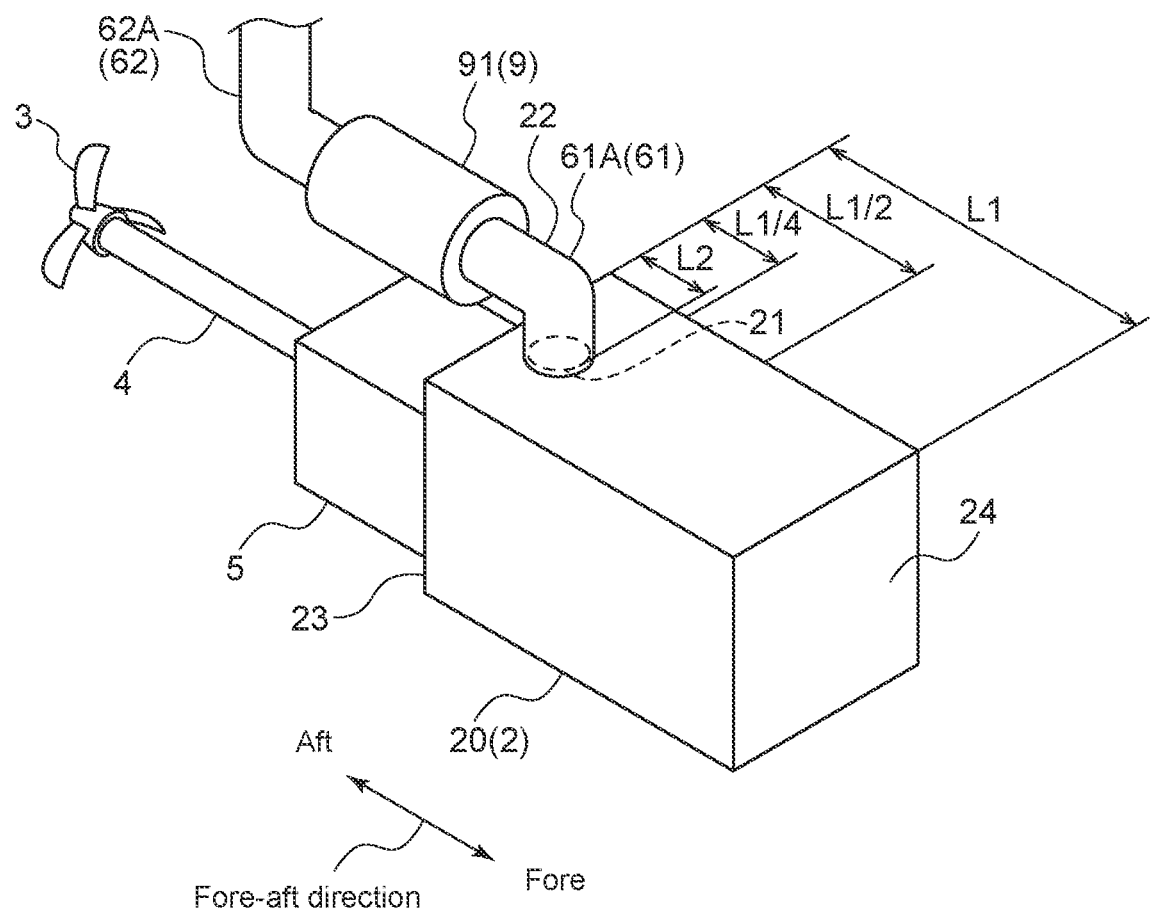
FIG. 5 is a perspective view of the exhaust gas purification device shown in FIG. 2.
Figure 6:
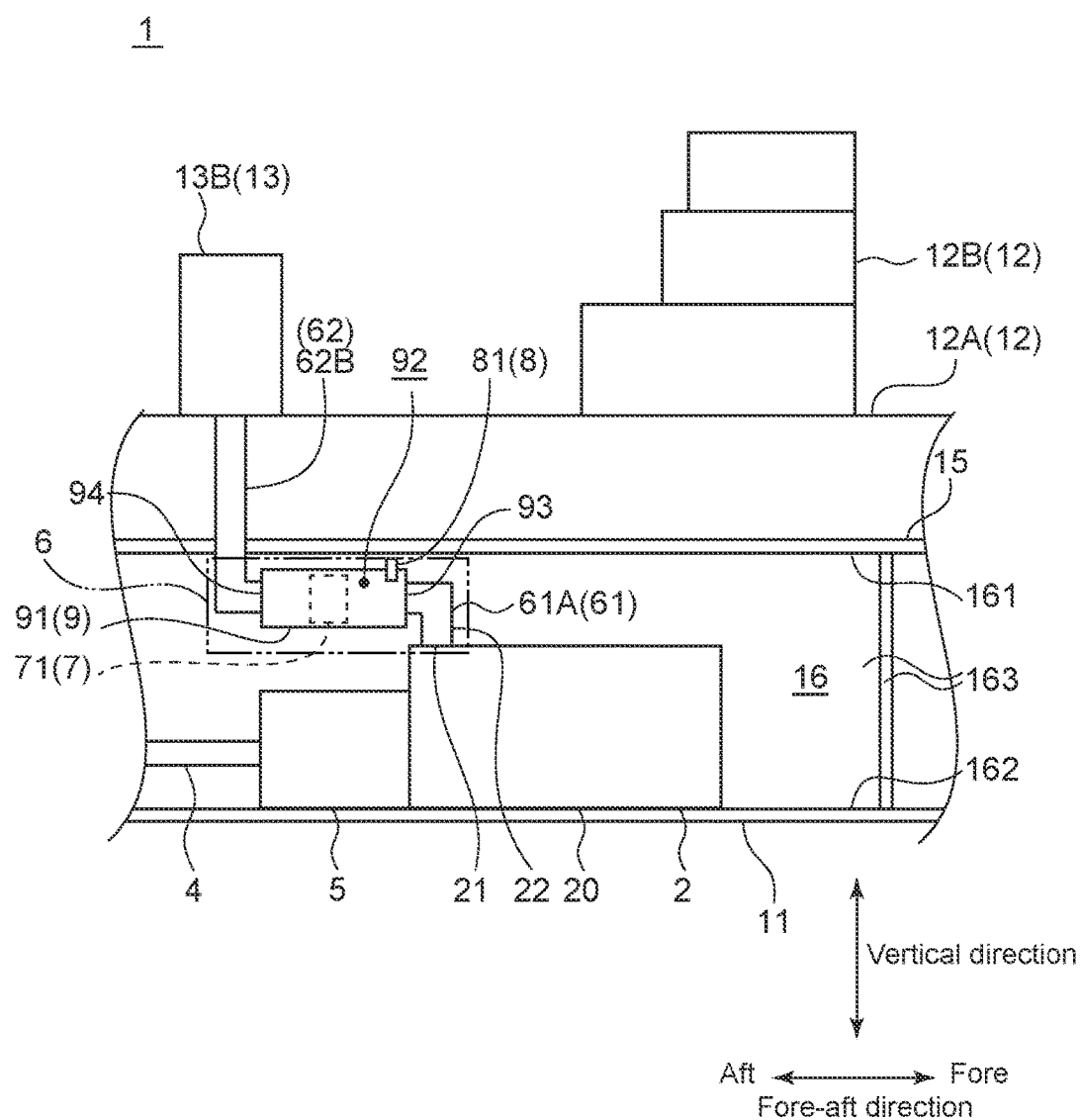
FIG. 6 is a partial, schematic side view of the ship for describing the exhaust gas purification device according to another embodiment of the present invention.

FIG. 5 is a perspective view of the exhaust gas purification device shown in FIG. 2. FIG. 6 is a partial, schematic side view of the ship for describing the exhaust gas purification device according to another embodiment of the present invention. The ship 1 shown in FIG. 6 is different from the ship 1 in which the stack 13 (13A) is disposed above the engine body 20 in that the stack 13 (13B) is disposed at a position shifted to the aft side from the engine body 20. Here, "above" means that the stack 13 is located above the engine body 20 in the vertical direction, and when the engine body 20 and the stack 13 are viewed from above, at least a part of the stack 13 overlaps the engine body 20.

In some embodiments, as shown in FIGS. 2, 5, and 6, the casing 9 is arranged above the marine gear 5 disposed in the engine room 16. Here, "above" means that the casing 9 is located above the marine gear 5 in the vertical direction, and when the casing 9 and the marine gear 5 are viewed from above, at least a part of the casing 9 overlaps the marine gear 5. Further, in the illustrated embodiment, the whole of the casing 9 is arranged inside the engine room 16.

According to the above configuration, the casing 9 is arranged above the marine gear 5 disposed in the engine room 16. In the engine room 16, an engine accessory (not shown) such as a cooling water pipe for feeding cooling water for cooling the engine 2 may be provided above the engine 2 (engine body 20). Therefore, when the casing 9 is arranged in the space above the marine gear 5, which has more room than the space above the engine 2, the layout of the exhaust gas purification device 6 can be improved. Further, since the casing 9 can be arranged at a position away from the cooling water pipe, it is possible to suppress the decrease in the temperature of the exhaust gas flowing through the exhaust passage 22 due to heat transfer from the cooling water pipe. Further, when the casing 9 is not arranged above the engine 2, the workability for servicing the engine 2 can be improved.

In some embodiments, as shown in FIGS. 2, 5, and 6, the casing 9 has a longitudinal direction and is arranged such that the longitudinal direction is along the fore-aft direction of the hull 11. The casing 9 is arranged such that the side provided with the intake port 93 in the longitudinal direction is located on the fore side, and the side provided with the exhaust port 94 in the longitudinal direction is located on the aft side. Further, the first exhaust gas pipe 61A is connected to the exhaust port 21 of the engine 2 and the intake port 93 of the casing 9. In this case, the casing 9 has a longitudinal direction and is arranged such that the longitudinal direction is along the fore-aft direction of the hull 11. Here, since the propeller shaft 4 extends along the fore-aft direction, a dead space is likely to occur along the fore-aft direction above the marine gear 5 to which the propeller shaft 4 and the propeller shaft 4 are connected. When the casing 9 is arranged in this dead space, the layout of the exhaust gas purification device 6 can be improved. Further, since the casing 9 is arranged such that the longitudinal direction is along the fore-aft direction of the hull 11, even if there is no room in the height direction in the space above the marine gear 5, the casing 9 can be arranged in the space.

In some embodiments, as shown in FIGS. 2, 5, and 6, the height dimension of the marine gear 5 is less than the height dimension of the engine 2 (engine body 20). In this case, since the height dimension of the marine gear 5 is less than the height dimension of the engine 2, the height dimension of the space above the marine gear 5 in the engine room 16 is larger than that of the space above the engine 2. Accordingly, even if there is no room in the height direction in the space above the engine 2 in the engine room 16, since the space above the marine gear 5 has room in the height direction, the casing 9 can be arranged in the space above the marine gear 5.

In some embodiments, as shown in FIG. 5, in the fore-aft direction of the hull 11, L2<L1/2 is satisfied, where L1 is a length from one end 23 of the engine 2 (engine body 20) close to the marine gear 5 to the other end 24 of the engine 2 away from the marine gear 5, and L2 is a length from the one end 23 to the exhaust port 21 of the engine 2. In the illustrated embodiment, the length L2 is a length from the one end 23 to an edge farthest from the one end 23 of the exhaust port 21 of the engine 2. In this case, L2 satisfies L2<L1/2. That is, the exhaust port 21 of the engine 2 is disposed closer to the marine gear 5 than the center of the engine 2 (engine body 20) in the fore-aft direction, so that the distance between the intake port 93 of the casing 9 arranged above the marine gear 5 and the exhaust port 21 of the engine 2 can be shortened. When the distance between the exhaust port 21 of the engine 2 and the intake port 93 of the casing 9 is shortened, it is possible to suppress the reduction in the temperature of the exhaust gas to be introduced into the casing 9.

Further, in some embodiments, as shown in FIG. 5, L2 satisfies L2<L1/4. In this case, the distance between the intake port 93 of the casing 9 arranged above the marine gear 5 and the exhaust port 21 of the engine 2 can be further shortened.

In some embodiments, as shown in FIG. 6, the casing 9 has a longitudinal direction, and the casing 9 is arranged above the marine gear 5 disposed in the engine room 16 such that the longitudinal direction is along the fore-aft direction of the hull 11. Further, the stack 13 (13B) is disposed at a position shifted to the aft side from the position just above the engine body 20. In the illustrated embodiment, as shown in FIG. 5, the stack 13 (13B) is disposed above at least one of the marine gear 5 or the propeller shaft 4. Here, "above" means that the stack 13 (13B) is located above the marine gear 5 or the propeller shaft 4 in the vertical direction, and when the marine gear 5 or the propeller shaft 4 and the stack 13 are viewed from above, at least a part of the stack 13 overlaps the marine gear 5 or the propeller shaft 4.

With the above configuration, the distance between the exhaust port 94 of the casing 9 and the stack 13 (13B) can be shortened compared with the case where the stack 13 (13A) is disposed above the engine body 20. Further, the length of the second exhaust gas pipe 62B connecting the exhaust port 94 of the casing 9 and the stack 13B can be reduced compared with the second exhaust gas pipe 62A connecting the exhaust port 94 of the casing 9 and the stack 13A. Further, when the distance between the exhaust port 94 of the casing 9 and the stack 13 (13B) is shortened, the exhaust gas purification device 6 can be compactly arranged in the ship 1.

Figure 7:
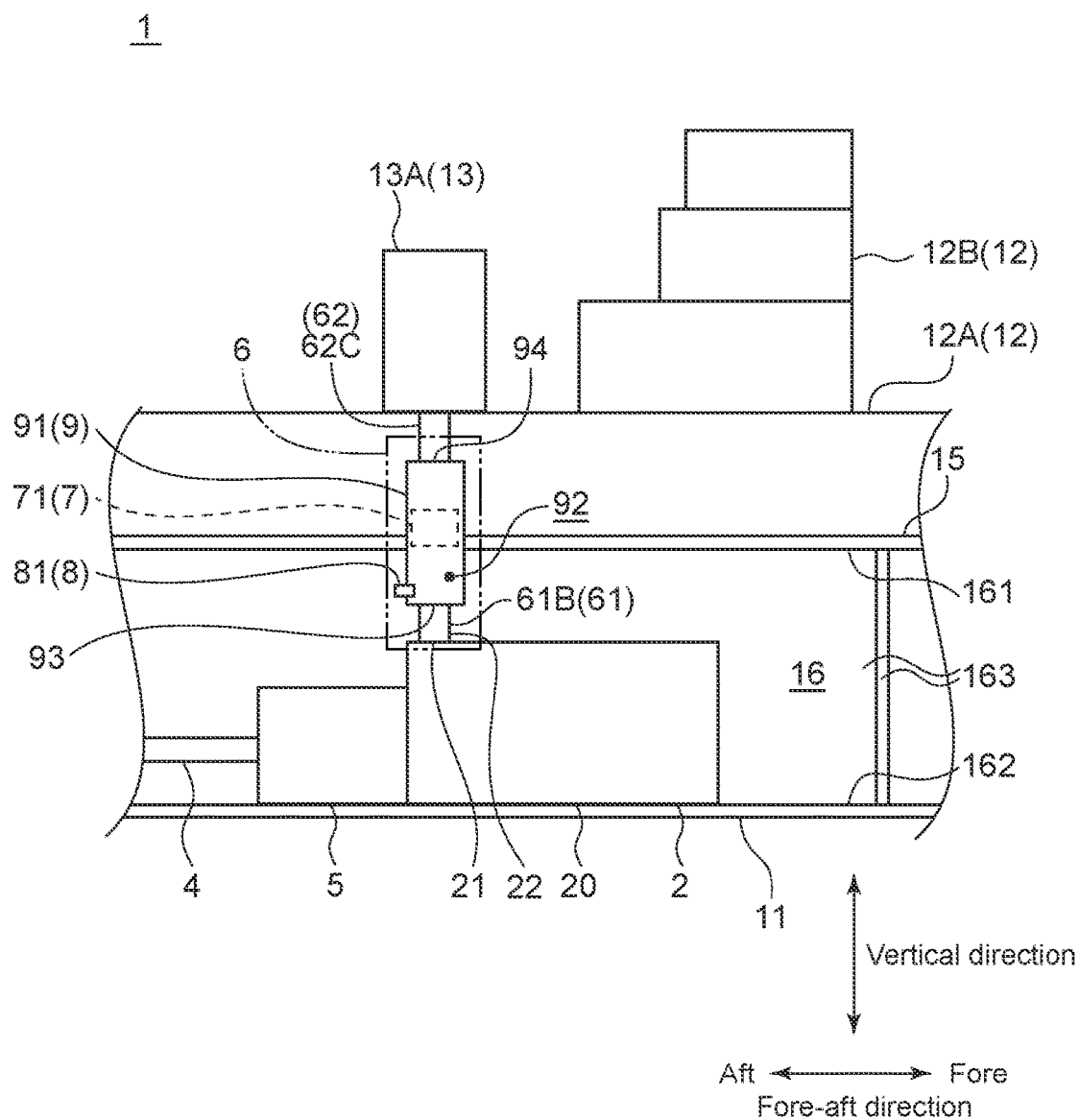
FIG. 7 is a partial, schematic side view of the ship for describing the exhaust gas purification device according to another embodiment of the present invention.

FIG. 7 is a partial, schematic side view of the ship for describing the exhaust gas purification device according to another embodiment of the present invention.

In some embodiments, as shown in FIG. 7, the casing 9 has a longitudinal direction, and the casing 9 is arranged above the engine 2 (engine body 20) such that the longitudinal direction is along the vertical direction. Here, "above" means that the casing 9 is located above the engine 2 in the vertical direction, and when the casing 9 and the engine 2 are viewed from above, at least a part of the casing 9 overlaps the engine 2.

In the illustrated embodiment, the casing 9 is arranged such that the side provided with the intake port 93 in the longitudinal direction is located on the lower side, and the side provided with the exhaust port 94 in the longitudinal direction is located on the upper side. Further, the exhaust port 21 of the engine 2 and the intake port 93 of the casing 9 are arranged so as to face each other, and the exhaust port 21 of the engine 2 and the intake port 93 of the casing 9 are connected to the first exhaust gas pipe 61A.

With the above configuration, since the casing 9 has a longitudinal direction, and the casing 9 is arranged above the engine 2 such that the longitudinal direction is along the vertical direction, the distance between the exhaust port 21 of the engine 2 and the intake port 93 of the casing 9 can be shortened. When the distance between the exhaust port 21 of the engine 2 and the intake port 93 of the casing 9 is shortened, it is possible to suppress the reduction in the temperature of the exhaust gas to be introduced into the casing 9.

In some embodiments, as shown in FIG. 7, a part of the casing 9 is disposed inside the engine room 16, and another part of the casing 9 is disposed outside the engine room 16. In the illustrated embodiment, one longitudinal end of the casing 9 with the intake port 93 is disposed inside the engine room 16, and the other longitudinal end is disposed outside the engine room 16 (hull 11) so as to protrude upward from the upper deck 15. In the embodiment shown in FIG. 7, the other end of the casing 9 is disposed inside the first upper structure 12A. In this case, since a part of the casing 9 disposed above the engine 2 is located inside the engine room 16 in which the engine 2 is disposed, the distance between the exhaust port 21 of the engine 2 and the intake port 93 of the casing 9 can be shortened. When the distance between the exhaust port 21 of the engine 2 and the intake port 93 of the casing 9 is shortened, it is possible to suppress the reduction in the temperature of the exhaust gas to be introduced into the casing 9. Further, since another part of the casing 9 is located outside the engine room 16, even if there is no room in the height direction in the space above the engine 2 (engine body 20) in the engine room 16, the casing 9 can be arranged such that the longitudinal direction is along the vertical direction.

In some embodiments, as shown in FIG. 7, the casing 9 has a longitudinal direction, and the casing 9 is arranged above the engine 2 (engine body 20) such that the longitudinal direction is along the vertical direction. Further, the casing 9 is disposed below the stack 13 (13A) for discharging the exhaust gas from the exhaust passage 22 to the outside. Here, "below" means that the casing 9 is located below the stack 13A in the vertical direction, and when the casing 9 and the stack 13A are viewed from above, at least a part of the casing 9 overlaps the stack 13A. In the illustrated embodiment, the distance between the exhaust port 94 of the casing 9 and the stack 13A can be shortened compared with the embodiments shown in FIGS. 2 and 5. Further, the length of the second exhaust gas pipe 62C connecting the exhaust port 94 of the casing 9 and the stack 13A can be reduced compared with the second exhaust gas pipes 62A and 62B. In the embodiment shown in FIG. 7, the exhaust port 94 of the casing 9 and the intake port (not shown) of the stack 13A disposed at the lower end of the stack 13A are arranged so as to face each other. Further, the second exhaust gas pipe 62C is formed in a straight tube extending along the longitudinal direction.

According to the above configuration, the casing 9 is disposed below the stack 13A for discharging the exhaust gas from the exhaust passage 22 to the outside. Since the casing 9 is arranged such that the longitudinal direction is along the vertical direction, the distance between the exhaust port 94 of the casing 9 and the stack 13A can be shortened. When the distance between the exhaust port 94 of the casing 9 and the stack 13A is shortened, the exhaust gas purification device 6 can be compactly arranged in the ship 1.

In the above-described embodiments, as shown in FIGS. 2 to 7, the exhaust port 21 of the engine 2 is disposed at an upper portion of the engine 2 (engine body 20). In the illustrated embodiment, the exhaust port 21 of the engine 2 is formed so as to open upward. With the above configuration, the exhaust port 21 of the engine 2 is disposed at an upper portion of the engine 2. Here, since the casing 9 is disposed above the marine gear 5 or the engine 2, the distance between the exhaust port 21 of the engine 2 and the intake port 93 of the casing 9 can be shortened. When the distance between the exhaust port 21 of the engine 2 and the intake port 93 of the casing 9 is shortened, it is possible to suppress the reduction in the temperature of the exhaust gas to be introduced into the casing 9.

In another embodiment, the exhaust port 21 of the engine 2 may be formed so as to open sideward. Particularly, in the case where the casing 9 is arranged above the marine gear 5 such that the longitudinal direction of the casing 9 is along the fore-aft direction, by providing the exhaust port 21 of the engine 2 at the one end 23 shown in FIG. 5, the distance between the exhaust port 21 of the engine 2 and the intake port 93 of the casing 9 can be shortened.

As described above, in some embodiments, the reducing agent addition device 8 includes the injection nozzle 81. As shown in FIGS. 2 to 4, 6, and 7, the injection nozzle 81 is attached to the casing 9 and has a nozzle hole (not shown) inserted in the casing 9. The injection nozzle 81 is configured to inject the reducing agent into the casing 9. With the above configuration, since the injection nozzle 81 is attached to the casing 9, the injection nozzle 81 is close to the catalytic part 7. When the injection nozzle 81 is close to the catalytic part 7, it is possible to narrow a region of the exhaust passage 22 in which the exhaust gas containing the reducing agent flows. Further, it is possible to suppress the occurrence of deposits on the upstream side of the region of the exhaust passage 22 in the flow direction of the exhaust gas. In addition, since the injection nozzle 81 is attached to the casing 9, the configuration of the reducing agent addition device 8 can be simplified, and the work of attaching the reducing agent addition device 8 to the ship 1 can be facilitated.

In some embodiments, as shown in FIGS. 2 to 4, 6, and 7, the injection nozzle 81 is configured to jet the reducing agent along a direction intersecting the flow direction of the exhaust gas. In the illustrated embodiment, as shown in FIGS. 2 to 4, 6, and 7, the injection nozzle 81 is configured to jet the reducing agent along a direction perpendicular to the flow direction of the exhaust gas.

In the embodiment shown in FIGS. 2, 4, and 6, the casing 9 is arranged such that the longitudinal direction is along the fore-aft direction. Accordingly, the exhaust gas flows in the interior space 92 of the casing 9 from the fore side to the aft side along the fore-aft direction. The injection nozzle 81 is attached to the upper side or the lower side of the cylinder portion 91 in the vertical direction, and is configured to jet the reducing agent in the upper-lower direction which is perpendicular to the fore-aft direction.

In the embodiment shown in FIGS. 3 and 7, the casing 9 is arranged such that the longitudinal direction is along the vertical direction. Accordingly, the exhaust gas flows in the interior space 92 of the casing 9 from the lower side to the upper side along the vertical direction. The injection nozzle 81 is attached to the lower portion of the cylinder portion 91 in the vertical direction, and is configured to jet the reducing agent in the horizontal direction (including fore-aft direction) which is perpendicular to the vertical direction.

With the above configuration, the injection nozzle 81 jets the reducing agent along a direction intersecting the flow direction of the exhaust gas, so that the reducing agent can be mixed with the exhaust gas uniformly from an inner wall portion of the casing 9 with the injection nozzle 81 to an opposite inner wall portion away from the injection nozzle 81. Thus, it is possible to efficiently purify NOx (nitrogen oxide). In the case where the injection nozzle 81 jets the reducing agent in the upper-lower direction to the exhaust gas flowing through the interior space 92 of the casing 9 arranged such that the longitudinal direction is along the fore-aft direction, the reducing agent can be mixed with the exhaust gas more uniformly, compared with the case where the injection nozzle 81 jets the reducing agent in the horizontal direction to the exhaust gas flowing through the interior space 92 of the casing 9 arranged such that the longitudinal direction is along the vertical direction.

As described above, the ship 1 according to some embodiments includes the hull 11, the engine 2 disposed in the engine room 16 defined in the hull 11, the exhaust passage 22 of the engine 2, and the exhaust gas purification device 6. In this case, the ship 1 can remove NOx (nitrogen oxide) from the exhaust gas discharged from the engine 2 with the exhaust gas purification device 6. Further, since the ship 1 allows the exhaust gas flowing through the exhaust passage 22 of the engine 2 and the exhaust gas introduced into the casing 9 to be kept at a higher temperature than a predetermined temperature, the occurrence of deposits in the exhaust passage 22 of the engine 2 and the casing 9 can be suppressed.

The ship 1 according to the above-described embodiments is a coastal vessel for carrying goods and passengers in rivers and canals. However, the present invention may be applied to ships other than a coastal vessel.

The present invention is not limited to the embodiments described above, but includes modifications to the embodiments described above, and embodiments composed of combinations of those embodiments. For example, in the above-described embodiments, the reducing agent added by the reducing agent addition device 8 is urea water, but the reducing agent may be ammonia water, ammonia gas, or the like.

REFERENCE SIGNS LIST

1 Ship
11 Hull

12 Upper structure
12A First upper structure
12B Second upper structure
13, 13A, 13B Stack
14 Side shell
15 Upper deck
16 Engine room
17 Bow
18 Stern
2 Engine
20 Engine body
21 Exhaust port
22 Exhaust passage
23 One end
24 Other end
3 Propeller
4 Propeller shaft
5 Marine gear
6 Exhaust gas purification device
61, 61A, 61B First exhaust gas pipe
62, 62A to 61C Second exhaust gas pipe
7 Catalytic part
71 Selective reducing catalyst
8 Reducing agent addition device
81 Injection nozzle
9 Casing
91 Cylinder portion
92 Interior space
93 Intake port
94 Exhaust port
161 Upper plate portion
162 Bottom plate portion
163 Side plate portion
CL Center line
D Inner diameter of exhaust gas pipe
L Length of exhaust gas pipe

The invention claimed is:

1. An exhaust gas purification device disposed in an exhaust passage of an engine disposed in an engine room defined in a hull, the exhaust gas purification device being configured to remove at least a nitrogen oxide from an exhaust gas discharged from the engine, the exhaust gas purification device comprising:
a catalytic part including a selective reducing catalyst for selectively reducing the nitrogen oxide;
a reducing agent addition device configured to add a reducing agent to the exhaust gas on an upstream side of the catalytic part in a flow direction of the exhaust gas; and
a casing configured to contain the catalytic part,
wherein at least a part of the casing is disposed inside the engine room, and
wherein the exhaust gas purification device further comprises an exhaust gas pipe connecting an exhaust port of the engine and an intake port of the casing, the exhaust gas pipe satisfying L/D<10, where L is a length of the exhaust gas pipe from the exhaust port of the engine to the intake port of the casing, and D is an inner diameter of the exhaust gas pipe.

2. The exhaust gas purification device according to claim 1,
wherein the casing has a longitudinal direction, and the casing is arranged above the engine such that the longitudinal direction is along a vertical direction.

3. The exhaust gas purification device according to claim 2,
wherein a part of the casing is disposed inside the engine room, and another part of the casing is disposed outside the engine room.

4. The exhaust gas purification device according to claim 2,
wherein the casing is disposed below a stack for discharging the exhaust gas from the exhaust passage to outside.

5. The exhaust gas purification device according to claim 1,
wherein the reducing agent addition device includes an injection nozzle attached to the casing and having a nozzle hole inserted in the casing, the injection nozzle being configured to inject the reducing agent into the casing.

6. The exhaust gas purification device according to claim 5,
wherein the injection nozzle is configured to jet the reducing agent along a direction intersecting a flow direction of the exhaust gas.

7. A ship, comprising:
a hull;
an engine disposed in an engine room defined in the hull;
an exhaust passage of the engine; and
the exhaust gas purification device according to claim 1.

8. An exhaust gas purification device disposed in an exhaust passage of an engine disposed in an engine room defined in a hull, the exhaust gas purification device being configured to remove at least a nitrogen oxide from an exhaust gas discharged from the engine, the exhaust gas purification device comprising:
a catalytic part including a selective reducing catalyst for selectively reducing the nitrogen oxide;
a reducing agent addition device configured to add a reducing agent to the exhaust gas on an upstream side of the catalytic part in a flow direction of the exhaust gas; and
a casing configured to contain the catalytic part,
wherein at least a part of the casing is disposed inside the engine room,
wherein the casing is disposed above a marine gear disposed in the engine room, the marine gear being configured to change a rotational speed of a crank shaft of the engine and transmit the rotational speed to a propeller shaft, and
wherein L2<L1/2 is satisfied, where L1 is a length from one end of the engine close to the marine gear to another end of the engine away from the marine gear, and L2 is a length from the one end to an exhaust port of the engine, in a fore-aft direction of the hull.

9. The exhaust gas purification device according to claim 8,
wherein the casing has a longitudinal direction, and the casing is arranged such that the longitudinal direction is along a fore-aft direction of the hull.

10. The exhaust gas purification device according to claim 8,
wherein the marine gear has a height dimension less than a height dimension of the engine.

11. The exhaust gas purification device according to claim 8,
wherein an exhaust port of the engine is disposed at an upper portion of the engine.

12. The exhaust gas purification device according to claim 8,
wherein the reducing agent addition device includes an injection nozzle attached to the casing and having a nozzle inserted in the casing, the injection nozzle being configured to inject the reducing agent into the casing.

13. The exhaust gas purification device according to claim 12, wherein the injection nozzle is configured to jet the reducing agent along a direction intersecting a flow direction of the exhaust gas.

14. A ship, comprising:

a hull;

an engine disposed in an engine room defined in the hull;

an exhaust passage of the engine, and the exhaust gas purification device according to claim 8.

* * * * *